No. 858,037. PATENTED JUNE 25, 1907.
W. SUDEKUM.
ROD PACKING.
APPLICATION FILED NOV. 26, 1906.
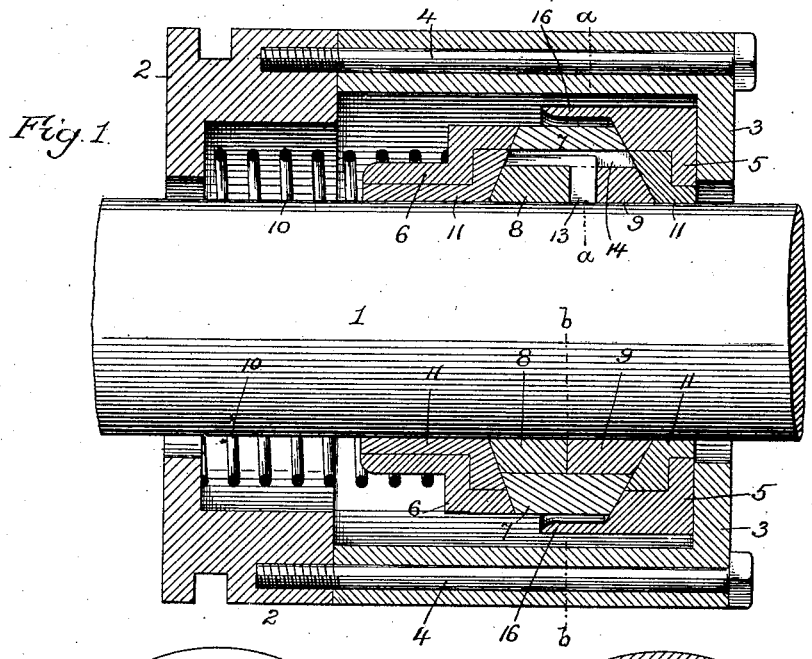
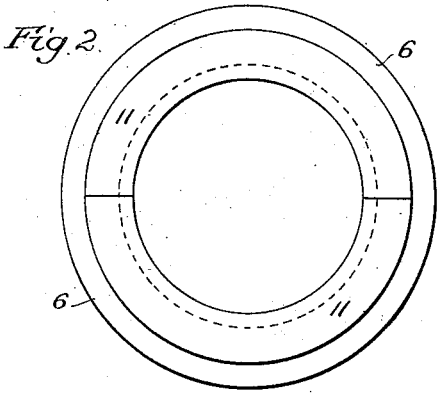
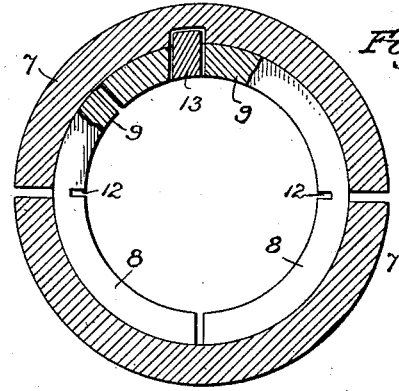
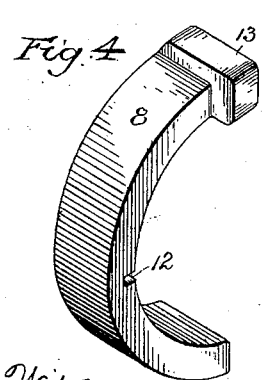
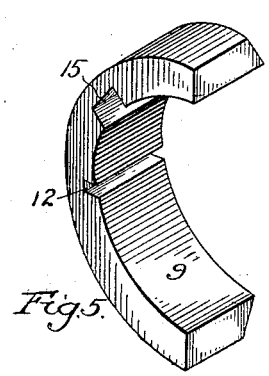
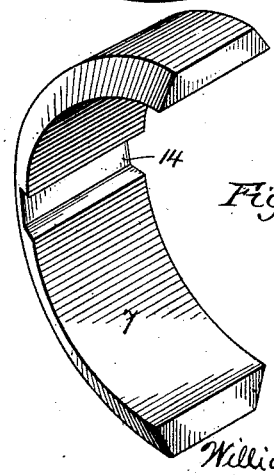
Witnesses
Hamilton D. Turner
Kate A. Beadle
Inventor
William Sudekum
by his Attorneys
Smith & Frazier

UNITED STATES PATENT OFFICE.

WILLIAM SUDEKUM, OF NASHVILLE, TENNESSEE, ASSIGNOR OF ONE-HALF TO AUGUST SCHARDT, OF NASHVILLE, TENNESSEE.

ROD-PACKING.

No. 858,037.     Specification of Letters Patent.     Patented June 25, 1907.

Application filed November 26, 1906. Serial No. 345,084.

*To all whom it may concern:*

Be it known that I, WILLIAM SUDEKUM, a citizen of the United States, residing in Nashville, Tennessee, have invented certain Improvements in Rod-Packing, of which the following is a specification.

My invention relates to that class of sectional metallic rod packing which consists of an outer enveloping ring and a pair of inner rings abutting face to face, said ring structure being contained between and confined by front and back glands, the object of my invention being to so construct such a rod packing that, without the employment of any means other than the rings themselves, said rings or ring sections will be firmly locked in their proper relation to each other so as to break joints, but will, at the same time, be perfectly free to contract and expand, the members of the packing being such that they can be cheaply produced and rapidly assembled in their proper relation to each other by unskilled labor, since the possibility of a wrong assemblage of the parts is precluded by the construction of the parts themselves.

In the accompanying drawing:—Figure 1 represents a vertical sectional view of a rod packing constructed in accordance with my invention; Fig. 2 is an inner face view of the inner gland of the packing; Fig. 3 is a transverse section partly on the line *a—a*, Fig. 1, and partly on the line *b—b* Fig. 1, and Figs. 4, 5 and 6 are perspective views of certain of the ring segments illustrating the features of their construction to which my invention particularly relates.

In Fig. 1 of the drawing, 1 represents part of the rod which is to be packed, 2 a stud or boss secured to or forming part of the cylinder head, valve chest, or other structure, and 3 a cap secured to said boss by means of bolts 4, said boss and cap inclosing a chamber in which the packing is disposed.

The packing comprises an outer gland 5, an inner gland 6, and three rings 7, 8 and 9, said rings being disposed between the two glands and being, by preference, beveled on their front and rear faces for engagement with correspondingly beveled faces of the glands, whereby the rings are confined both longitudinally and radially.

The outer gland bears against the inner face of the cap 3, and the inner gland is acted upon by a coiled spring 10, interposed between said gland and the boss 2, and each gland has a split lining ring 11 shouldered for longitudinally bearing upon the gland and constituting the bearing surface of the gland upon the rod, whereby these linings can be readily removed when they become worn, and replaced by new ones, in order to render it unnecessary to replace the entire gland. By this construction, also, provision is made for ready application of the glands to the rods of standard locomotives, where the end of the rod, secured to the cross-head, is somewhat larger in diameter than the body portion of the said rod, since the glands, being slightly larger in diameter than the said enlarged end of the rod, may be easily slipped over the said head, and the segmental lining rings 11 easily placed within said glands.

Each of the rings 7, 8 and 9 is composed, in the present instance, of two semi-circular segments, although it may be composed of a greater number of segments, if desired, or, on the other hand, may consist of a single ring split so as to provide for its necessary expansion and contraction. The outer ring 7 surrounds the inner rings 8 and 9, and the latter are disposed side by side with abutting faces, and each of these inner ring segments has, in its inner periphery about midway of its extent, a notch 12, whereby flexibility is imparted to the segment in order that it may spread or contract independently of its bodily movement from or toward the rod, said notch also providing a receptacle for lubricant, for distribution throughout the surface of the rod.

One of the segments of the ring 8 has, at one end, a lug 13 which projects both outwardly beyond the periphery of the ring segment and inwardly beyond the inner face of the same, the outwardly projecting portion of the lug engaging a notch or recess 14 in one of the segments of the outer ring 7, and the inwardly projecting portion of the lug engaging a notch or recess 15 in the inner face of one of the inner ring segments 9, these elements of the packing being clearly illustrated in Figs. 4, 5 and 6. By reason of this construction, all of the ring segments are retained in proper relation to each other, so as to break joints, and this result is attained without the use of any locking devices other than the rings themselves, a feature which precludes the improper disposition of the rings in their relation to one another and facilitates the correct and rapid assembling of the rings by unskilled labor.

The outer gland 5 has a rearwardly projecting annular flange 16, which surrounds a portion of the ring 7, but is free from contact therewith, so that the ring structure and the inner gland are free to move in a direction transversely to the rod without corresponding movement of the outer gland, thereby permitting the packing to better accommodate itself to local irregularities in the surface of the rod than it could if all of the elements of the packing were compelled to move as a unit. The flange 16, however, serves to preclude any material departure from proper alinement of the gland 5 and the packing rings, and thereby prevents uneven wear upon the gland or lateral shifting of the latter which such uneven wear would permit.

By forming the engaging lug on the inner face of one of the inner rings and the corresponding recess in the adjoining face of the opposite ring the full length of each segment is preserved, whereas a locking lug projecting inwardly from the outer ring and occupying a position between the ends of the segments of the inner ring necessarily shortens said segments and interferes with the contraction of the same.

It should be noted that the packing rings in my construction may be cast and suitably finished or they may be machined.

I claim:—

1. A rod packing having rings abutting against each other, one ring having a lug projecting from its abutting face, and the other ring having a recess in its abutting face for the reception of said lug.

2. A rod packing having an outer ring and a pair of inner rings contained within said outer ring and having abutting faces, one of the inner rings having a lug which projects both beyond the abutting face of the ring and beyond its periphery, the other inner ring having, in its abutting face, a recess for the reception of said lug, and the outer ring having, in its inner face, a recess for the reception of that portion of the lug which projects beyond the periphery of the inner ring.

3. Rod packing having an outer ring with recess in its inner face, and a pair of inner rings contained within said outer ring and abutting against each other, one of said inner rings having a projecting lug for entering the recess in the outer ring.

4. Rod packing having packing rings confined between two glands, each of which has segmental lining rings shouldered for longitudinal engagement with the glands and constituting the bearing surface between the latter and the rod.

5. Rod packing comprising inner and outer glands and a ring structure confined between the same, the outer gland having a flange surrounding said ring structure but free from contact therewith, whereby limited independent transverse movement of the ring structure and the outer gland is permitted.

6. Rod packing comprising an outer ring, a pair of inner rings inclosed within said outer ring, and abutting against each other, and a lug whereby all three of the ring members are locked against independent circumferential movement.

In testimony whereof, I have signed my name to this specification, in the presence of two subscribing witnesses.

WM. SUDEKUM.

Witnesses:
SCOTT SHIVERS,
A. S. BRITT.